(12) United States Patent
Wagner et al.

(10) Patent No.: US 6,169,911 B1
(45) Date of Patent: Jan. 2, 2001

(54) GRAPHICAL USER INTERFACE FOR A PORTABLE TELEPHONE

(75) Inventors: Annette Wagner, Los Altos; Jeffrey Herman, Palo Alto; Herbert Jellinek, Aptos; Susan Booker, San Carlos, all of CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 08/938,378

(22) Filed: Sep. 26, 1997

(51) Int. Cl.[7] ................................................. H04B 1/38

(52) U.S. Cl. ......................... 455/566; 455/564; 379/88.14

(58) Field of Search .................................... 455/550, 564, 455/556, 557, 575, 90; 345/333, 156, 169; 379/88.14

(56) References Cited

U.S. PATENT DOCUMENTS

| | | | |
|---|---|---|---|
| 4,908,848 | 3/1990 | Hanawa | 379/63 |
| 5,146,612 | 9/1992 | Grosjean et al. | |
| 5,457,108 | 10/1995 | Atkins et al. | |
| 5,568,540 | * 10/1996 | Greco et al. | 379/88.14 |
| 5,579,489 | * 11/1996 | Dornier et al. | 455/575 |
| 5,584,054 | 12/1996 | Tyneski et al. | 455/89 |
| 5,590,178 | * 12/1996 | Murakami et al. | 379/88.14 |
| 5,603,090 | 2/1997 | Nguyen et al. | 455/54.1 |
| 5,615,248 | 3/1997 | Norimatsu | 379/58 |
| 5,657,049 | 8/1997 | Ludolph et al. | 345/145 |
| 5,722,088 | 2/1998 | Storn et al. | |

(List continued on next page.)

FOREIGN PATENT DOCUMENTS

641137 * 3/1995 (EP) .

OTHER PUBLICATIONS

Krishnamurthy a et al., Journal of Parallel and Distributed Computing, vol. 38, No. 2, Nov. 1, 1996, p. 130, 131, 138, 139.

Yang C–T et al, Institute of Electronics Information and Comm. Eng., vol. E79–D, No. 11, Nov. 1, 1996, pp. 1545–1560.

Glenn Krasner, "The Smalltalk–80 Virtual Machine", Learning Research Group, Byte Publication Inc., Aug. 1981, pp. 300–320.

Product Brochure, Nokia Connecting People, "The Mobile Office", Sep. 1996, 8 pages.

Product Photos, Nokia, "Nokia 9000", date unknown, 10 pages.

* cited by examiner

Primary Examiner—Edward F. Urban
(74) Attorney, Agent, or Firm—Blakely, Sokoloff, Taylor & Zafman LLP

(57) ABSTRACT

A portable telephone provides a graphical user interface (GUI) using a high-resolution display. The GUI provides a Universal Mailbox for storing both electronic mail and voicemail messages, either of which can be accessed by a user from the same display screen. An automatic reply feature allows a user to initiate an outgoing reply to a received message with the touch of a button. For a reply to a voicemail message, the GUI accesses Caller ID information to automatically identify and dial out to the phone number of the sender of the original message. For an electronic mail reply, the GUI automatically displays a reply form addressed to the source address. Reply forms may be generic, custom designed for a specific source address, or provided by the sender. An advanced call control feature automatically checks an outgoing telephone number against a database to determine whether the phone number is currently appropriate. Alternative or more appropriate phone numbers may be retrieved from the database and suggested to the user. An animated call duration indicator indicates the length of telephone calls. A ticker-tape display automatically displays scrolled text messages according to the context of what the user is doing.

14 Claims, 11 Drawing Sheets

U.S. PATENT DOCUMENTS

| | | | |
|---|---|---|---|
| 5,758,295 | * 5/1998 | Ahlber et al. | 455/566 |
| 5,797,089 | * 8/1998 | Nguyen | 455/556 |
| 5,797,098 | 8/1998 | Schroeder et al. . | |
| 5,852,783 | 12/1998 | Tabe et al. | 455/550 |
| 5,857,157 | * 1/1999 | Shindo | 455/556 |
| 5,875,403 | * 2/1999 | Christal | 455/550 |
| 5,884,193 | 3/1999 | Kaplan . | |
| 5,963,875 | 10/1999 | Go . | |
| 5,966,652 | 10/1999 | Coad et al. . | |
| 5,995,592 | 11/1999 | Shirai et al. . | |
| 6,029,072 | 2/2000 | Barber . | |
| 6,047,196 | 4/2000 | Makela et al. . | |

GRAPHICAL USER INTERFACE FOR A PORTABLE TELEPHONE

FIELD OF THE INVENTION

The present invention pertains to the field of portable communication devices. More particularly, the present invention relates to a user interface for a portable, hand-held telephone.

BACKGROUND OF THE INVENTION

Cellular telephones are widely used and are becoming increasingly more commonplace in society. As the state of the art in cellular telephones advances, there is a trend toward incorporating more features and more advanced functions into the devices. Unfortunately, while incorporating more functions into these devices can make them more versatile, it can also make them more difficult to use for many users due to the added complexity. Many users dislike learning to use electronic devices with many functions or do not have the time to do so. Accordingly, there is a need in the art for a portable cellular telephone which is capable of performing a wide variety of functions and which can be operated using an intuitive, easy-to-use user interface.

SUMMARY OF THE INVENTION

One aspect of the present invention is a portable telephone, which includes a transceiver for transmitting and receiving data, a display device, and control circuitry coupled to the transceiver and the display device. The control circuitry is configured to enable the portable telephone to send and receive electronic mail messages and voice messages. The control circuitry is also configured to cause a graphical user interface to be displayed, which allows the user to access both stored electronic mail messages and voice messages from the single display screen.

Another aspect of the present invention is a method of allowing a user to reply to a stored message. A user input selecting the message is received. In response to the user input, an appropriate reply mode is automatically entered based on the source of the message.

Another aspect of the present invention is a method of processing outgoing calls in a wireless handheld telephone communication device. User inputs specifying a destination telephone number are received for the purpose of initiating an outgoing call. In response to the user inputs, the destination telephone number is automatically referenced against a database to determine whether the destination telephone number is currently appropriate.

Another aspect of the present invention is a method of conveying current call information to a user in a portable telephone communication device. The communication device includes a display device. In accordance with the method, an animated indication of the duration of a telephone call is displayed on the display device.

Another aspect of the present invention is a wireless portable telephone comprising control circuitry, a transceiver coupled to the control circuitry for transmitting and receiving data over a wireless medium, and a display coupled to the control circuitry. The control circuitry is configured to automatically cause information to be scrolled across the display.

Another aspect of the present invention is a method, in a portable telephone, of allowing a user to transmit a message. In the method, previously requested data is received from a remote source. Information that is representative of the data is displayed on the display device. In response to a user input initiating a transmission mode, a form for a message to be transmitted is automatically selected based on the content of the displayed information at the time the user input is received.

Another aspect of the present invention is a method of allowing a user to transmit a message in a portable telephone in which data is received from a remote source. The content of the data is monitored for a predetermined content and when the predetermined content is detected, a mode is automatically entered to allow the user to transmit a message from the telephone.

Other features of the present invention will be apparent from the accompanying drawings and from the detailed description which follows.

DETAILED DESCRIPTION

A portable telephone having an intuitive graphical user interface is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

Overview

Figure 1:
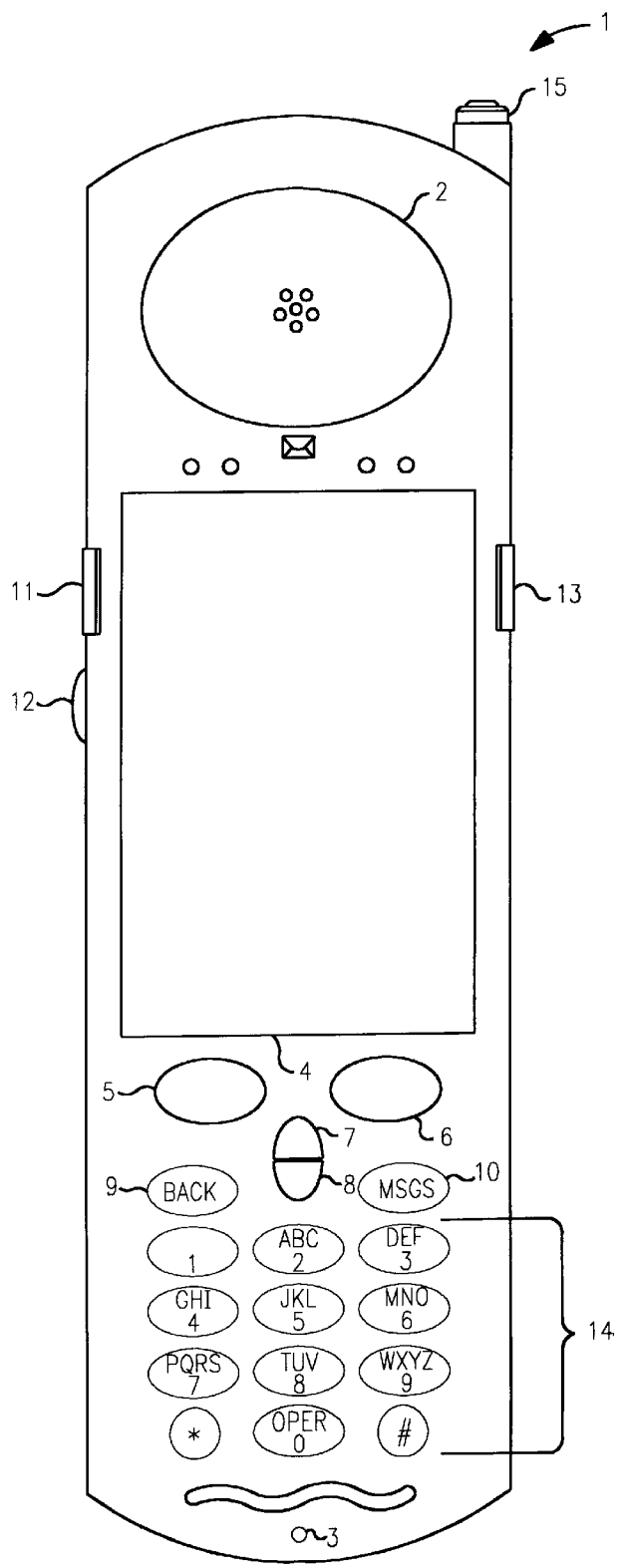
FIG. 1 illustrates a portable telephone in accordance with the present invention.

The present invention includes a portable telephone that provides an advanced yet easy-to-use graphical user interface (GUI) using a high-resolution display. FIG. 1 illustrates a portable, wireless telephone in accordance with the present invention. In one embodiment, the telephone 1 is a cellular telephone, which may be conventional except as provided otherwise in this description. The telephone 1 includes an earpiece 2 for outputting sound, a mouthpiece 3 for inputting sound, and a high-resolution display 4. As will be described below, the display 4 is used to present the GUI to the user of the telephone 1, using which the user can control all significant functions of the telephone. In one embodiment, the display 4 is a bit-mapped, gray-scale screen having a resolution of approximately 160×240 pixels at approximately 102 pixels per inch. The display 4 can be a liquid crystal display (LCD) or any other suitable type of display device. The phone 1 also includes a keypad 14, which includes standard alphanumeric keys, such as are found on many conventional telephones, and an extendible antenna 15 for transmitting and receiving data over a wireless (e.g., cellular) connection. The telephone 1 also includes various other controls, some of which are used with the features to be described below. In particular, the telephone 1 includes Select buttons 5 and 6, a Scroll Up button 7, a Scroll Down button 8, a Back button 9, a Messages button 10, a Send button 11, a Volume/Scroll Up/Down button 12, and an End button 13.

Figure 2:
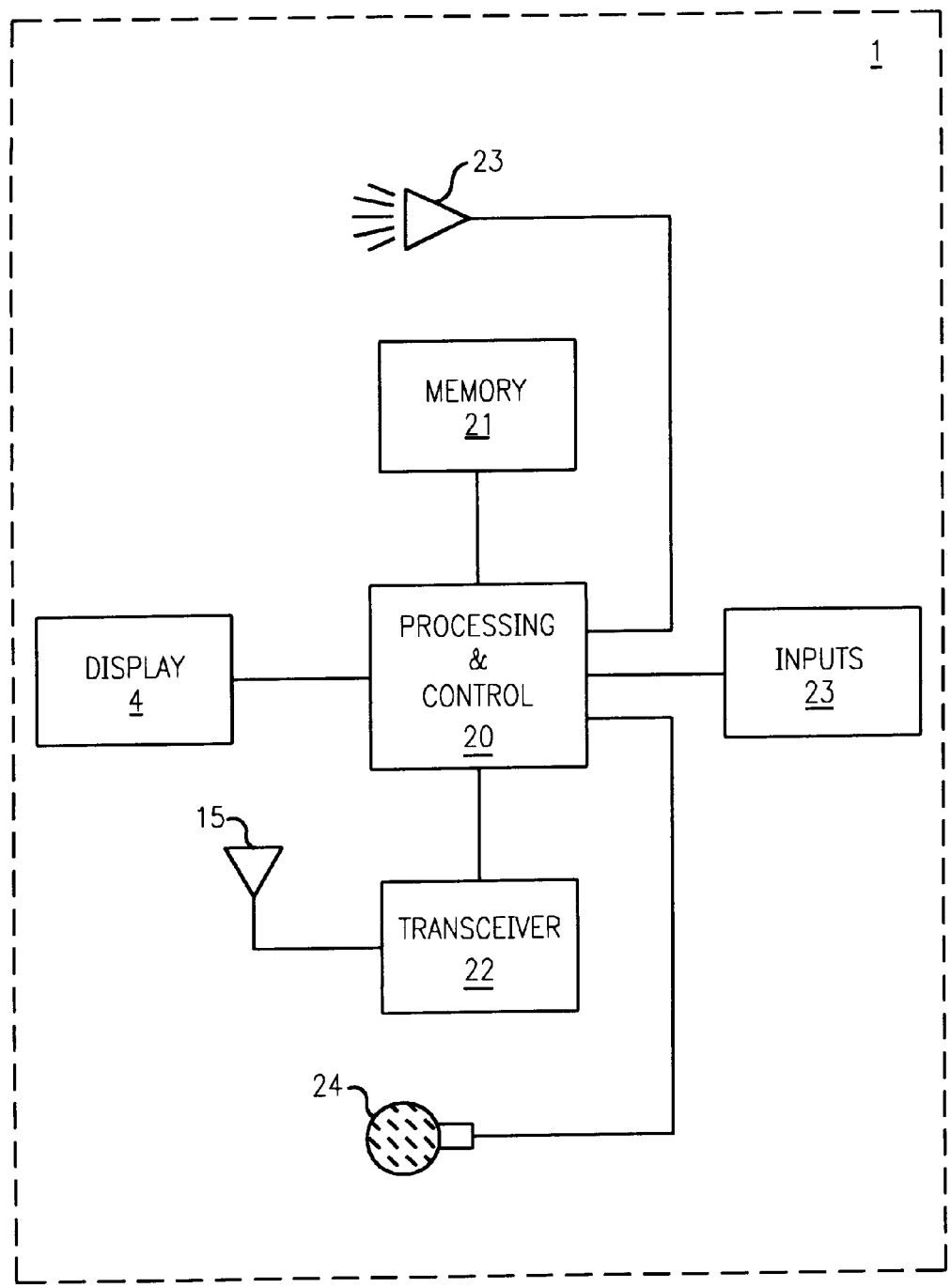
FIG. 2 is a block diagram of the internal components of the portable telephone of FIG. 1.

FIG. 2 illustrates a block diagram of the internal components of the present invention. Note that the diagram of FIG. 2 is intended to be a conceptual diagram and does not necessarily reflect the exact physical construction and interconnections of these components. As shown in FIG. 2, the telephone 1 includes processing and control circuitry 20, which controls the overall operation of the telephone. Coupled to the processing and control circuitry 20 are the display 4, memory 21, a transceiver 22, and inputs 23, a speaker 23, and a microphone 24. The speaker 23 is used to generate sound, which is output through the earpiece 2. The microphone 24 is used to receive sound through the mouthpiece 3. The transceiver 22, which is also coupled to the antenna 15, is used to transmit and receive (via antenna 15) data, including audio data and various other types of data (the nature of which will be described below). Note that in alternative embodiments, the transceiver 22 may be physically embodied as a separate transmitter and receiver. Inputs 23 represent buttons 5 through 14, in aggregate.

The processing and control circuitry 20 may include one or more of devices such as general-purpose microprocessors, digital signal processors (DSPs), application specific integrated circuits (ASICs), various types of signal conditioning circuitry, including analog-to-digital converters, digital-to-analog converters, input/output buffers, etc.

The memory 21 may include one or more physical memory devices, which may include volatile storage devices, non-volatile storage devices, or both. For example, memory 21 may include both random access memory (RAM), read-only memory (ROM), various forms of programmable and/or erasable ROM (e.g., PROM, EPOM, EEPROM, etc.), flash memory, or any combination of such devices.

The present invention includes steps which, in various embodiments, may be carried out by elements of the processing and control circuitry 20 (e.g., a microprocessor or a DSP) executing sequences of instructions. The instructions may be stored in a memory, such as memory 21. Software instructions (or data) may be loaded into the portable telephone 1 from another device, such as a remote computer system, over the wireless connection. In various embodiments, downloaded software instructions may be directly supported by the telephone 1, in which case execution of the instructions may be performed directly upon their being received. In other cases, downloaded instructions may not be directly executable by the telephone 1. Under these circumstances, the instructions may be executed using an interpreter, which interprets the instructions, or by otherwise executing instructions which convert the received instructions to instructions that can be directly executed.

Certain embodiments of the present invention may be carried out by hard-wired circuitry, rather than by executing software, or by a combination of hard-wired circuitry with software. Hence, it will be recognized that the present invention is not limited to any specific combination of hardware circuitry and software, nor to any particular source for software instructions.

Nonetheless, to facilitate description it is henceforth assumed that aspects of the present invention are generally carried out through the execution of software instructions in the telephone 1. It is envisioned that these instructions may be written in the Java™ programming language (hereinafter "Java") and, more specifically, in the PersonalJava™ subset of Java (hereinafter "Personal Java"), both developed by Sun Microsystems, Inc., of Palo Alto, Calif. Note, however, that other languages may be substituted within the scope of the present invention. As is well-known, Personal Java is a Java application environment designed specifically for network-connectable applications on consumer devices. The details of developing software in Java and Personal Java are well-known to those skilled in the relevant art and are not required for an understanding of the present invention. Accordingly, such details are not provided herein.

The use of Java has a number of advantages, including allowing the GUI to be hardware-independent. Moreover, various features and functions described herein can be added to the portable telephone 1 at virtually any time after the product is manufactured or purchased by simply downloading the appropriate instructions to the telephone 1 over the wireless connection.

The features of the GUI of the portable telephone 1 will now be described. Briefly, the GUI includes a "universal mailbox", which stores both electronic mail (e-mail) and voicemail messages in a common repository, and which allows the user to access both types of messages through a single display mode. An automatic reply ("auto-reply") feature allows a user to automatically initiate a reply to either an e-mail message or a voicemail message with the touch of a button. An "advanced call control" feature automatically intercepts outgoing phone calls before they are completed, determines whether the dialed phone number is valid for the current time and date, and suggests alternative phone numbers when appropriate. A "ticker-tape" display automatically scrolls information across the display 4, the content of which is automatically selected based on context. An animated call duration indicator indicates the duration of the current phone call. Other features will become apparent from the description which follows.

Figure 3A:
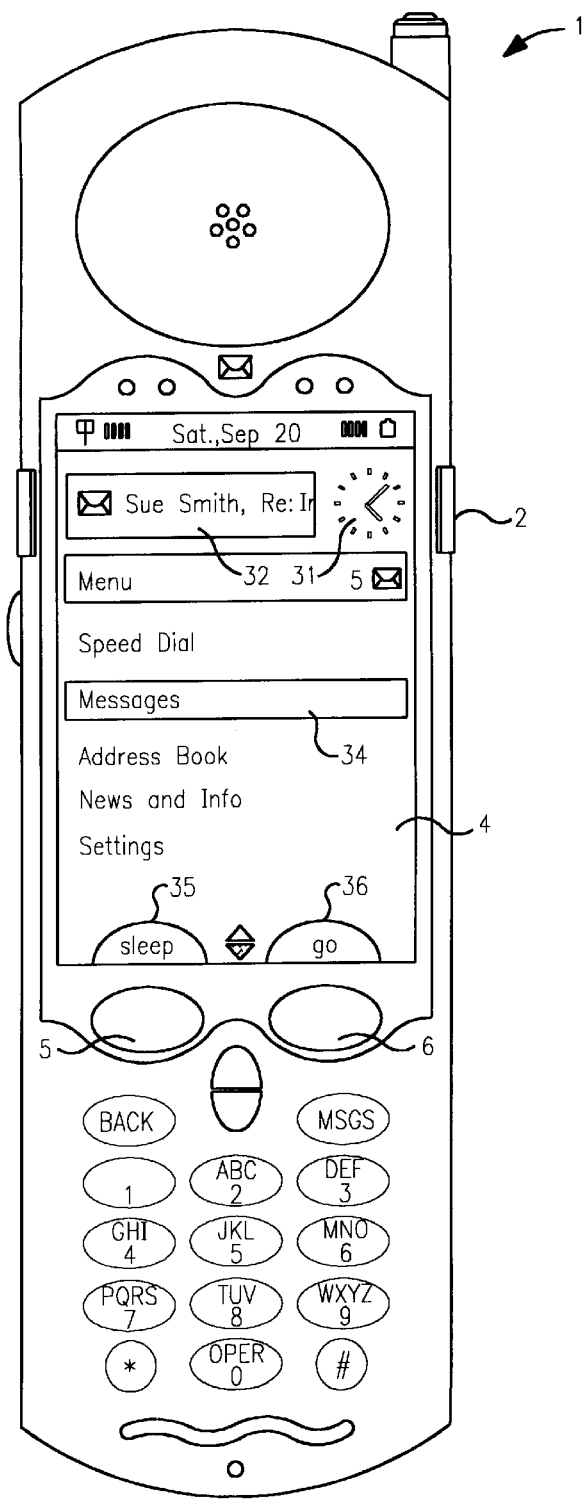
FIG. 3A illustrates a main menu screen of the portable telephone of the present invention.

FIG. 3A illustrates the main menu screen of the GUI, according to one embodiment. This screen appears automatically after power-up, and the user can return to it at any time by pressing the End button 2. From the main menu screen, the user can access various functions provided by the telephone, including speed dial, e-mail and voicemail messages, an address book, news and information, and configuration settings. A selection bar 34 indicates the user's current selection. The main menu screen includes a ticker-tape display field 32, in which various types of information are scrolled horizontally. In the main menu screen, the content of this information is dependent upon the user's current selection. For example, if the category "Messages" is selected, as shown in FIG. 3A, a listing of the senders of all unread messages will be scrolled horizontally through the ticker-tape display 32. For e-mail messages, the subject line of the messages will also be displayed. If the category "News & Info" is selected, a summary of news or other information contained in that category can be scrolled across the display 32. The information displayed in display 32 can be made to scroll repeatedly until the user selects a different function. Other uses of the ticker-tape display 32 will be described below.

The main menu screen also includes an animated call duration indicator 31. In one embodiment, the indicator 31 has the appearance of an analog clock. In one embodiment, the "face" of the clock 31 appears to become progressively shaded with color as a telephone call takes place to indicate the duration of the call. Specifically, color shading is added to the face of the clock 31 radially, and in a clockwise direction, as the minute hand (or second hand) moves around the face of the clock. Color shading appears to sweep around the face of the clock 31 in a radial arc from the point on the clock which represents the time at which the call began. Hence, shading is added so as to give the appearance that the shading is actually being "applied" by the sweeping minute hand (or the second hand).

The main menu screen further includes a Sleep "soft button" 35 and a Go soft button 36. By selecting the Sleep soft button 35, the user can cause the display 4 to enter a sleep mode. By selecting the Go soft button 36, the user can go to the current selection from the menu screen.

The functions of the controls described in FIG. 1 will now be described. Select buttons 5 and 6 are used to select soft buttons which may appear directly above them on the display 4 in certain modes. For example, referring again to FIG. 3A, button 5 is used to select the Sleep soft button 35, and button 6 is used to select the Go soft button 36. Scroll buttons 7 and 8 are used to move a current selection up or down, for example to move selection bar 34 between the different categories. Back button 9 is used to access the previously displayed screen. Messages button 10 is used to directly access the universal mailbox. Button 12 is used to adjust the volume up or down or to scroll the current selection up or down, depending upon the mode in which the telephone is operating (i.e., depending upon whether there is an active telephone connection). Send button 11 functions as a standard Send button such as found on many conventional cellular telephones. In addition, Send button 11 is used to dispatch an e-mail message or to initiate the auto-reply function (described below). End button 13 is used to access the main menu screen, as noted above, or to end a telephone call.

Figure 3B:
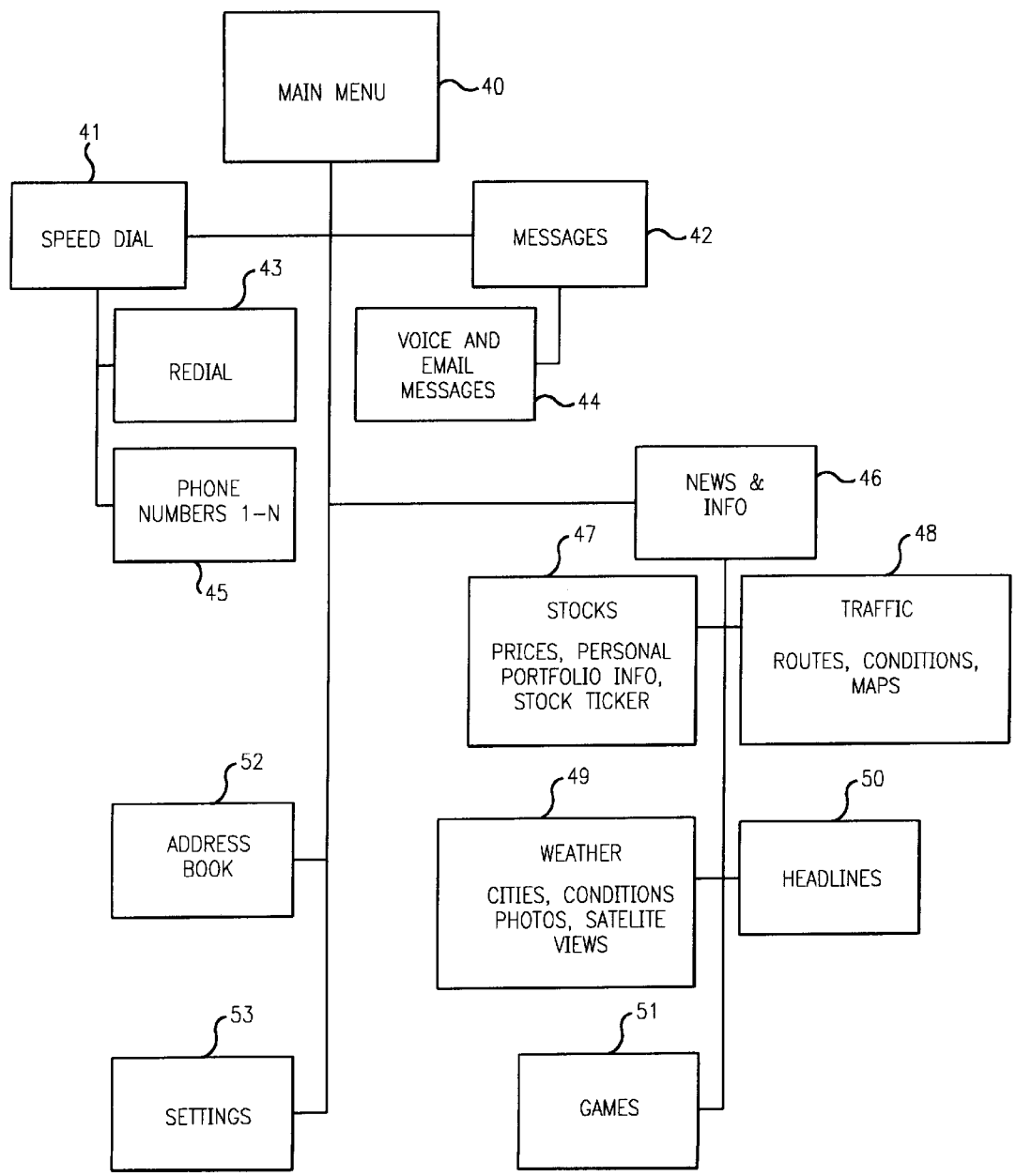
FIG. 3B is a diagram illustrating functional relationships between the various modes of the portable telephone.

FIG. 3B illustrates the functional relationships between the different modes/functions that a user can access using the GUI of the present invention. On power-up, the user initially encounters the main menu screen 40. From the main menu screen 40, the user can directly access speed dial mode 41, messages mode 42, address book mode 52, news and information mode 46, or settings mode 53. From the speed dial mode 41, the user can initiate telephone calls using previously-set speed dial numbers. The user can also dial any previously stored phone numbers 45 or access a redial function 43 to redial the most recently dialed phone number. By selecting the messages mode 42, the user is taken to the universal mailbox 44, which displays all stored e-mail and voicemail messages. The news and info mode 46 allows the user to access information received from a remote source over the wireless connection. The information accessible under the news and information category 46, which may be referred to as "third party" information, contains information on various topics, which may be user-specified. In the illustrated embodiment, the third party information includes information on the stock market 47, current traffic conditions 48, current weather conditions 49, current headlines 50, as well as games 51. Note that the particular types of information stored in this category can be easily varied within the scope of the present invention. This information can be acquired by the portable telephone 1 in response to a specific user input, automatically at predetermined times or intervals, or whenever the transmitting source transmits the information.

The features of the present invention are described now in greater detail with reference to FIGS. 4 through 10. These features are described primarily in terms of the outputs that are perceivable to the user. The precise manner in which these functions are implemented, or "coded", is not important for an understanding of the present invention. Many implementations are possible within the scope of the present invention, and such implementations will be readily appreciated from this description by one skilled in the relevant art.

Universal Mailbox

Figure 4:
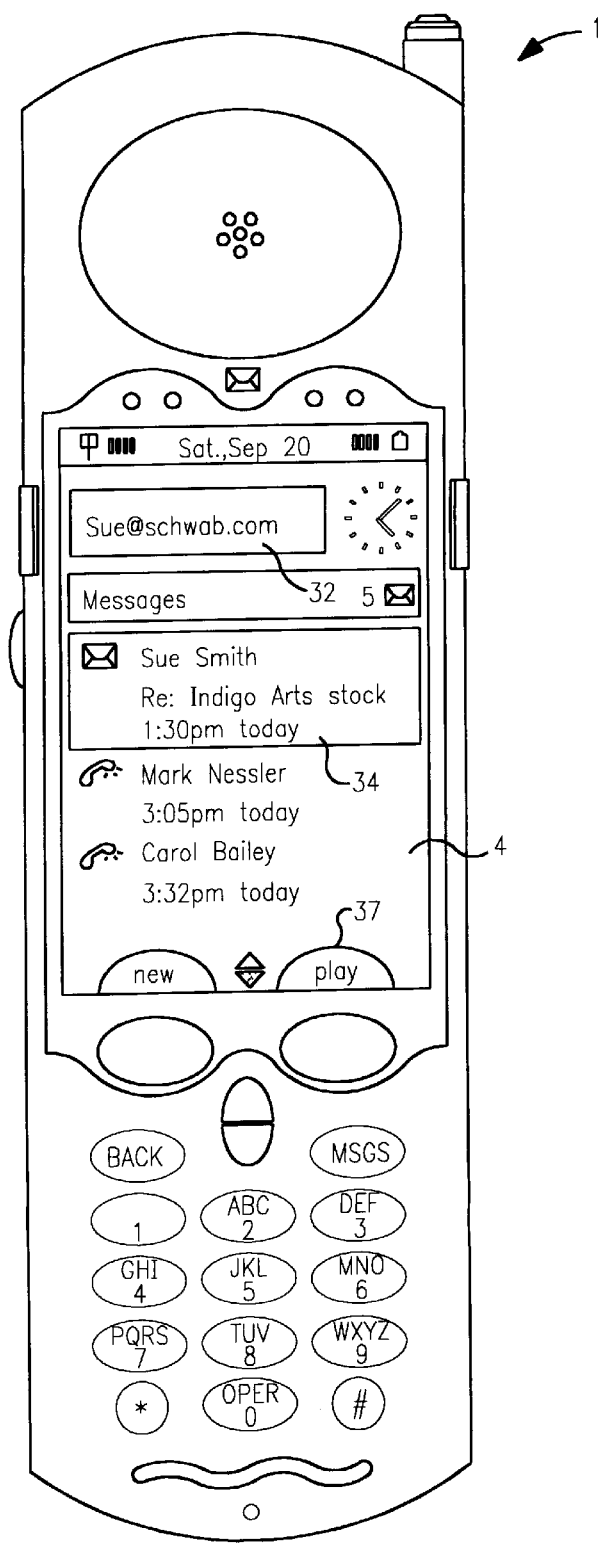
FIG. 4 illustrates a Universal Mailbox screen of the present invention.

Referring now to FIG. 4, the universal mailbox screen is illustrated. As noted above, the universal mailbox feature causes both e-mail and voicemail messages to be displayed to the user using a single display mode; thus, both e-mail messages and voicemail messages can be viewed simultaneously from the same display screen, which can be scrolled, if necessary, to view a large number of messages. Each message is listed by the name of its sender, and the time and date of receipt. In addition, e-mail messages include the subject line of the message. E-mail messages are further distinguished by a letter-shaped icon to the left of the sender's name, while voicemail messages are identified by a telephone handset icon to the left the sender's name. The time and date for each function can be set to be absolute or relative.

Figure 5:
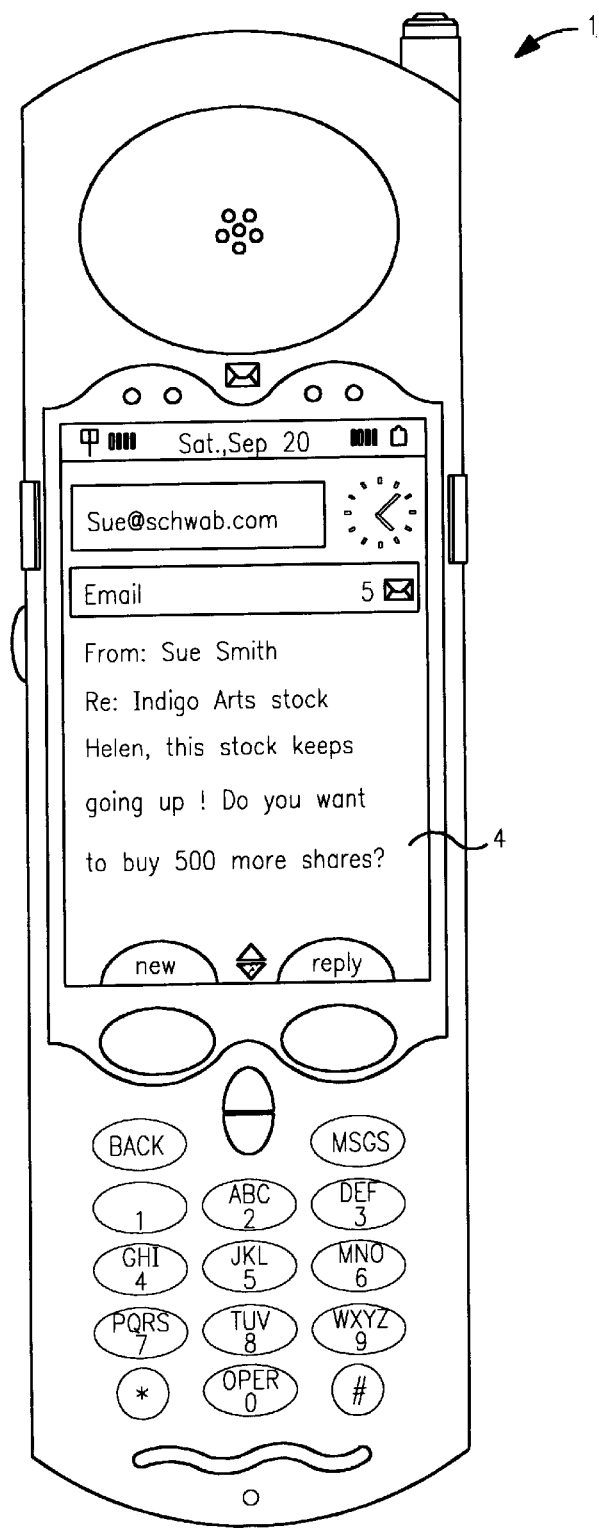
FIG. 5 illustrates a screen showing an electronic mail message.

A user can read an e-mail message on the display 4 or listen to a voicemail message by selecting the message from the list and then pressing the Play button 37. When the user selects a message, the sender's address (in the case of an e-mail message) or telephone number (in the case of a voicemail message) appears in the ticker-tape display 32, although the information is not scrolled in that case. For an e-mail message, the e-mail message (or the portion of it which will fit in the display screen 4) is displayed, as shown in FIG. 5.

Auto-Reply

The auto-reply function enables the user to generate a meaningful and quick reply to any message, regardless of whether it is an e-mail message or a voicemail message. If any message is currently selected and the user presses the Send button 11, the system will automatically enter an appropriate reply mode. More specifically, if the selected message is a voicemail message, the system will dial out using the telephone number of the sender of the message. Conventional Caller ID information, such as provided by many telephone services, can be used to ascertain the telephone number of the original sender. Also, the name of the original sender may be looked up in an electronic rolodex (which may or may not be stored within the telephone 1) using the Caller ID information and displayed to the user.

If, on the other hand, the selected message is an e-mail message, the system will automatically display a reply form addressed to the address of the sender when the Send button 11 is pressed. The user may then enter appropriate text using the alphanumeric keypad 14. To dispatch the e-mail message, the user presses the Send button 11 again.

Figure 6:
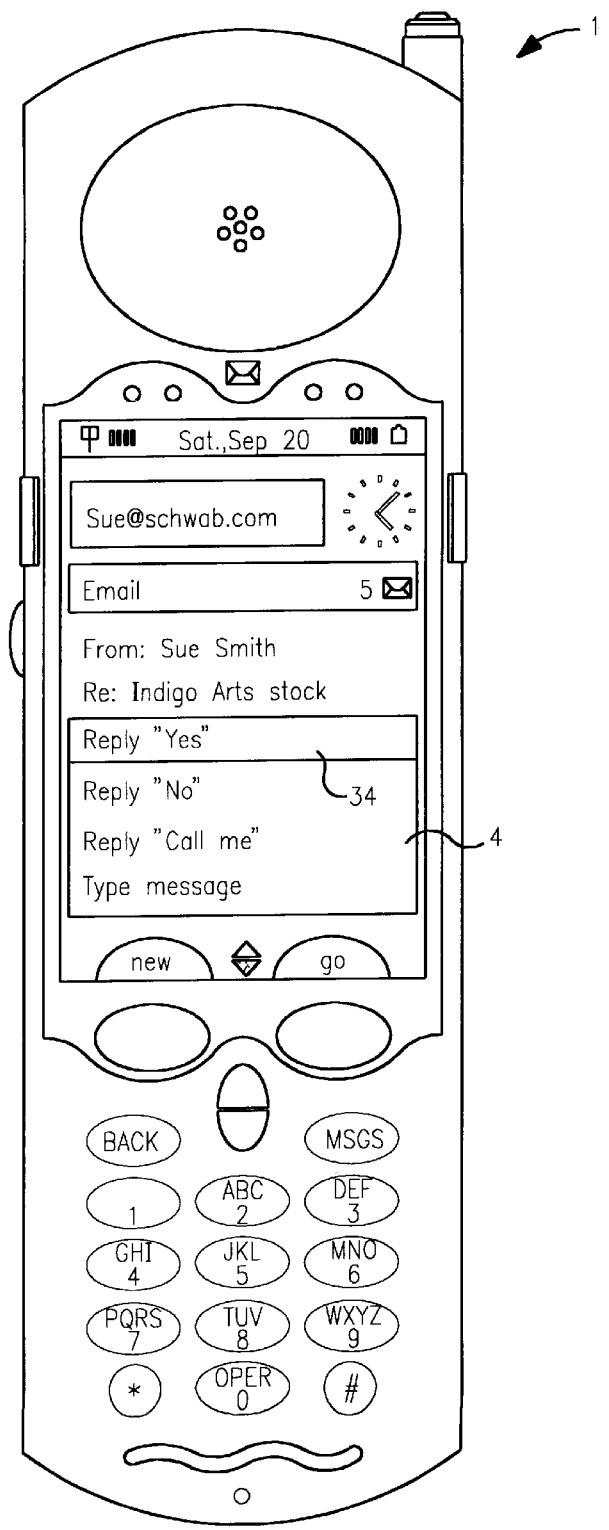
FIG. 6 illustrates a screen for selecting a reply to an electronic mail message in accordance with the present invention.
Figure 7:
FIG. 7 illustrates a screen displaying an advanced call control message.

In one embodiment, when a user wishes to reply to an e-mail message, the system presents a menu of options for reply forms. These reply forms may be standard for the system (generic) or customized. As shown in FIG. 6, a standard template of reply forms may include generic replies such as "Yes", "No", or "Call Me". Furthermore, a sender may explicitly provide a template including one or more reply forms. For example, a sender who is a stockbroker might send a template with the replies "Buy Company X", "Sell Company X", and "Call Me." In one embodiment, the user can further specify particular reply forms for individual senders. The auto-reply feature will automatically display the appropriate form (or choice of forms) for the particular sender when the Send button 11 is pressed while the message is selected. If there is no user-specified reply form for a particular sender, and the sender has not provided a reply form, the system will default to the generic template.

Advanced Call Control

The advanced call control feature increases the chances that a user will reach the person that he or she is trying to call with little additional effort on the part of the user. Often when a user makes a telephone call, his or her goal is to speak to a specific person and not to whomever happens to answer the telephone. Accordingly, the present invention includes an advanced call control function by which a user can create a profile for a person who is called often. The profile is stored in a database, which may be stored within the telephone 1 or in a remote system. In the profile, the user can assign one or more telephone numbers to a specific person and specify the times and/or dates when each phone number is appropriate. For example, the user might specify that a given person should be called at his office telephone during the day on Monday through Friday, at his home telephone in the early evenings, and at his cellular telephone on the weekends. Accordingly, when the user dials out using one of these numbers (whether entered manually or using speed dial), the system will automatically reference the entered telephone number against the profile (database) to determine whether the number is "valid" (appropriate) in view of the current day and/or time. If the phone number is determined to be currently valid, then the dial out sequence is executed normally. If another number is determined to be more appropriate based on the profile, the system will automatically display a message, such as that shown in FIG. 7, prompting the user to either choose an alternate number or confirm that the entered number should be used. If the alternate number is selected, the telephone 1 dials out using the alternate number. If the user does nothing in response to the prompt, the telephone completes the dial out sequence after a timeout period using the original number. Thus, the advanced call control feature increases the chances that a user will reach the person that he or she is trying to call with little additional effort on the part of the user.

Third Party Information

Figure 8:
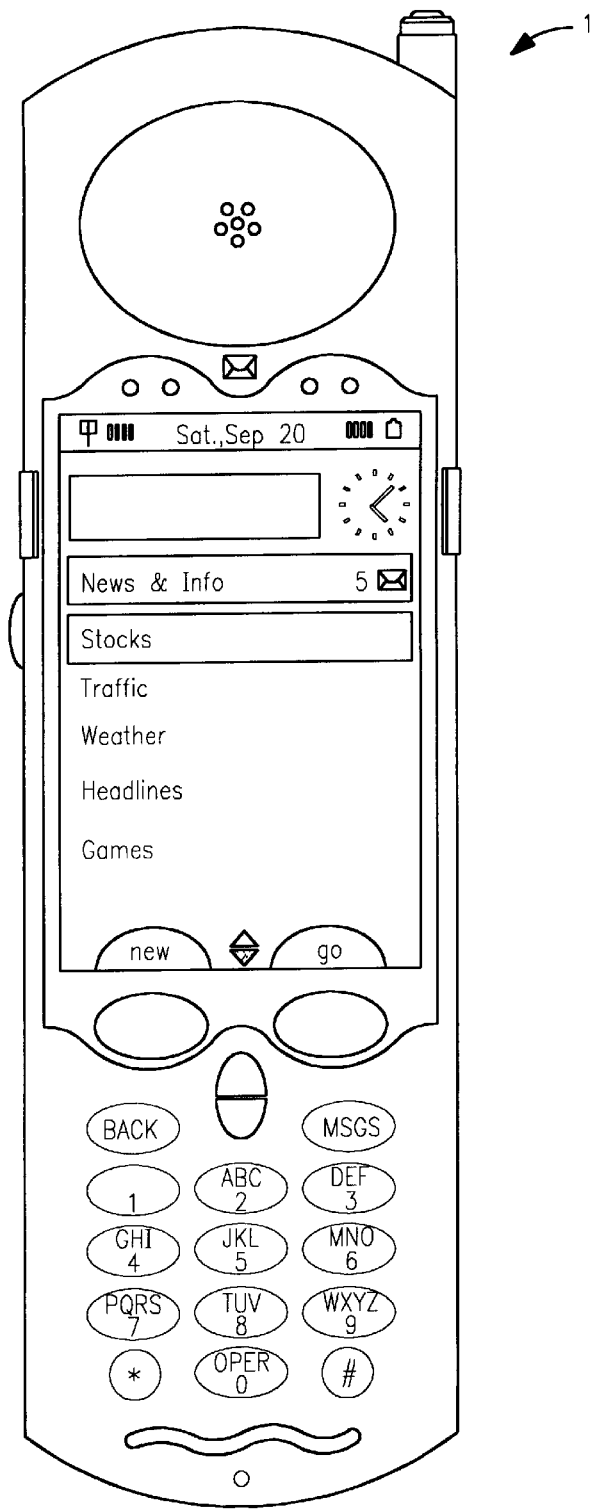
FIG. 8 illustrates a News & Info screen for accessing third party information.
Figure 9:
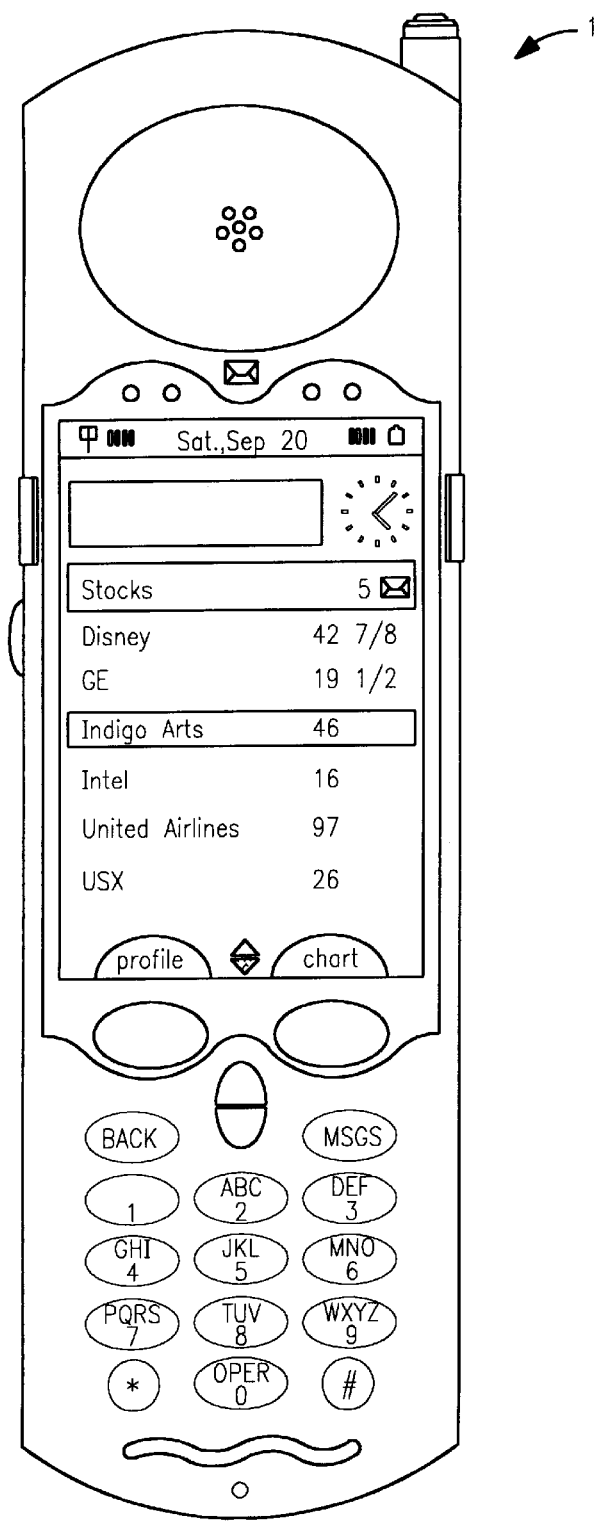
FIG. 9 illustrates a screen displaying third party information.
Figure 10:
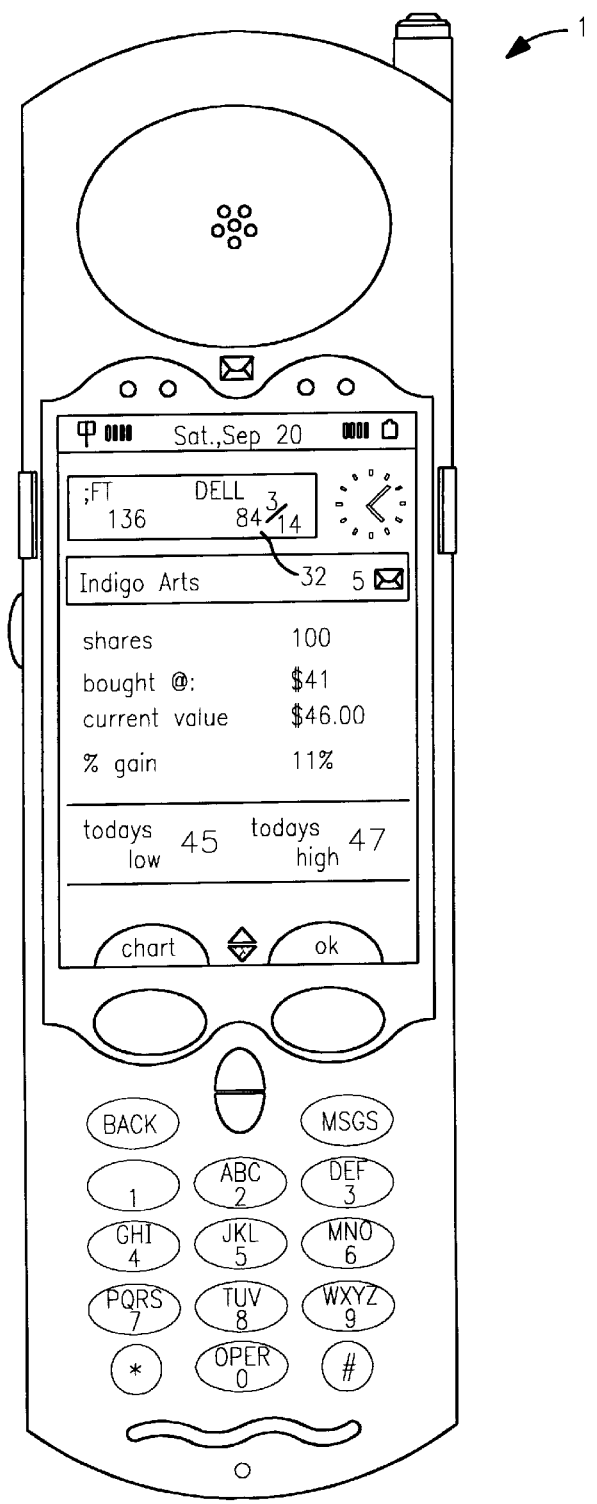
FIG. 10 illustrates a screen displaying third party information in addition to locally stored information and tickertape information.

As noted above, the user can access various types of third party information provided from a remote transmission source. Third party information is information received by the telephone from a remote source over the wireless connection, which may include real-time information. Third party information can be accessed from the "News and Info" screen, an example of which is illustrated in FIG. 8. As noted, the user may be able to select from various topics, such as stock market information, traffic and weather conditions, or current headlines. FIG. 9 shows an example of a simple display of stock market information. In one application, the system might be programmed to download only information relating to stocks that the user owns or stocks in which the user is specifically interested.

Third party information can also be combined with information stored locally in the telephone. For example, refer to FIG. 10, which shows a screen displaying current information for a given stock, "Indigo Arts", received from a remote source, displayed together with the number of shares of the stock owned by the user, which is stored locally. The system further automatically computes and displays the percent gain on the user's current holdings of this stock, as shown.

Ticker-Tape Display

As noted above, the ticker-tape display 32 may be used to scroll various types of information to the user, including third party information (e.g., traffic, headlines, weather, etc.) or information stored locally in the telephone (e.g., e-mail and voicemail messages). For example, when the telephone is in the News and Info mode, the ticker-tape display 32 can be used to display real-time information relating to various topics, such as stock prices in the example of FIG. 10.

Information scrolled in ticker-tape display 32 is automatically selected based on context, i.e., based on the information the user is currently viewing or the mode in which the telephone 1 is currently operating. For example, if the user has selected stocks from the News and Info menu, then stock market prices may be scrolled through the ticker-tape display 32. If the user has selected "Traffic" from the News and Info menu, then current traffic information can be scrolled. If the user has selected Messages from the main menu, then summary information on the user's new messages is scrolled.

Interactive Forms

Another feature of the present invention allows an e-mail transmission to be automatically designed based upon context. For example, in one embodiment if the user presses the Send button 11 while viewing stock market information, the system may automatically display an e-mail form addressed to his or her stock broker. The specific content of the form can be designed to suit the user's needs.

In addition, third party information can be automatically monitored for the presence of previously-specified content, such as the price of a particular stock rising or falling to a specified level. In response to detecting this previously-specified content, the system automatically provides a notification to the user, such as an audible tone or a displayed message. Further, the system can automatically display a customized, ready-to-send e-mail message in response to detecting this information. For example, in response to detecting the price of a stock hitting a specified level, the system may automatically display a prewritten e-mail message addressed to the stockbroker requesting a purchase of the stock.

Thus, a portable telephone having an intuitive graphical user interface has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A portable telephone comprising:

a transceiver for transmitting and receiving data;

a control;

a display device; and a processor coupled to the transceiver, the control, and the display device, wherein the processor is configured to enable the portable telephone to send and receive electronic mail messages and voice messages using the transceiver, wherein the processor is further configured to cause a graphical user interface to be provided using the display device, the graphical user interface allowing a user to access stored electronic mail messages and voice messages displayed simultaneously on the display device, wherein the processor is further configured to receive a user input from the control selecting a message displayed on the display device and, in response to the user input, automatically enter an electronic mail reply mode if the selected message is an electronic mail message or a voice reply mode if the selected message is a voice message.

2. A portable telephone according to claim 1, wherein the portable telephone is a cellular telephone of the hand-held variety.

3. In a wireless telephone communication device capable of receiving and storing electronic mail messages and voice messages, a method of allowing a user of the communication device to reply to a received message, the communication device including a display device, the method comprising:

displaying an indication of a stored message on the display device, wherein the stored message may be either an electronic mail message or a voice message, the stored message having a source identifier;

receiving a user input selecting the received message; and in response to the user input, automatically entering either an electronic mail reply mode or a voice reply mode based on the source identifier, wherein the source identifier may include Caller ID information if the message is a voice message, such that said automatically entering includes using the Caller ID information to identify the source identifier as a telephone number.

4. A method according to claim 3, wherein the source identifier comprises a telephone number if the message is a voice message, and wherein said automatically entering an appropriate one of a plurality of reply modes based on the source identifier further comprises:

receiving Caller ID information specifying the telephone number; and automatically initiating a dial-out sequence using the Caller ID information in response to receiving the user input.

5. A method of enabling a user of a wireless telephone communication device to reply to a received message, the method comprising transmitting sequences of instructions from a host processing system to the wireless telephone communication device, the sequences of instructions including instructions which, when executed on the wireless telephone communication device, cause the wireless telephone communication device to perform the method recited in claim 3.

6. A method implemented in a wireless communication device of allowing a user of the wireless communication device to access both voice messages and electronic mail messages, the method comprising:

receiving a plurality of voice messages and electronic mail messages;

generating a graphical user interface for allowing the user to access both the voice messages and the electronic mail messages from a single mailbox, including causing items representing both the electronic mail messages and the voice messages to be displayed simultaneously on a display component of the wireless communication device, such that the user can select the displayed items to access electronic mail messages or voice messages from a single rendered display in response to the user input;

receiving a user input from a single control of the wireless communication device, the user input selecting one of the items displayed on the display device representing a message, the message having been received from a source; and in response to the user input, automatically selecting either an electronic mail reply mode or a voice reply mode, as appropriate, based on the source of the message.

7. A wireless communication device comprising:

a control for receiving user inputs;

means for receiving a plurality of voice messages and electronic mail messages;

means for generating a graphical user interface for allowing the user to access both the voice messages and the electronic mail messages from a single mailbox, wherein said means for generating includes means for causing items representing both the electronic mail messages and the voice messages to be displayed simultaneously on a display component of the wireless communication device, such that the user can select the displayed items to access electronic mail messages or voice messages from a single rendered display;

means for selecting one of the items displayed on the display device representing a message in response to a user input received at the control, the message having been received from a source; and means for automatically selecting either an electronic mail reply mode or a voice reply mode, as appropriate, in response to the user input received at the control, based on the source of the message.

8. A wireless communication device comprising:

a control;

a display device; and a processor programmed to cause the display device to display contents of a single mailbox of a user, the mailbox having displayed contents representing both stored electronic mail messages and stored voice messages directed to the user, each stored electronic mail or voice message having a source identifier, the processor further programmed to cause the wireless communication device to enter either an electronic mail reply mode or a voice reply mode, as appropriate, based on the source identifier in response to a user input applied at the control selecting a message displayed in the mailbox.

9. A wireless communication device according to claim 8, wherein the source identifier comprises Caller ID information, and wherein the processor is further programmed to use the Caller ID information to identify the source identifier as a telephone number.

10. A wireless communication device according to claim 8, wherein the source identifier comprises a telephone number, and wherein the processor is further programmed to receive Caller ID information specifying the telephone number and to automatically initiate a dial-out sequence using the Caller ID information in response to receiving the user input.

11. A wireless communication device according to claim 8, wherein the processor is further programmed to identify the selected message as an electronic mail message and to automatically select and display on the display device a reply form having predetermined, non-address content appropriate for the sender of the selected message in response to the user input.

12. In a wireless telephone communication device capable of receiving and storing electronic mail messages and voice messages, a method of allowing a user of the telephone communication device to reply to a received message, the telephone communication device including a display device, the method comprising the steps of:

displaying an indication of a stored message on the display device, wherein the stored message may be an electronic mail message or a voice message, the stored message having a source identifier;

receiving a user input selecting the received message; and in response to the user input, automatically entering either an electronic mail reply mode or a voice reply mode based on the source identifier, wherein said automatically entering either an electronic mail reply mode or a voice reply mode includes determining whether the source identifier includes Caller ID information; and if the source identifier includes caller ID information, using the Caller ID information to identify the source identifier as a telephone number.

13. A method according to claim 12, wherein the source identifier comprises a telephone number, and wherein the step of automatically entering an appropriate one of a plurality of reply modes based on the source identifier further comprises the step of:

receiving Caller ID information specifying the telephone number; and automatically initiating a dial-out sequence using the Caller ID information in response to receiving the user input.

14. In a wireless telephone communication device capable of receiving and storing electronic mail messages and voice messages, a method of allowing a user of the communication device to reply to a received message, the communication device including a display device, the method comprising:

displaying an indication of a stored message on the display device, wherein the stored message may be either an electronic mail message or a voice message, the stored message having a source identifier representing a sender of the message;

receiving a user input selecting the received message; and in response to the user input, automatically entering either an electronic mail reply mode or a voice reply mode, as appropriate, based on the source identifier, including identifying the source identifier as an electronic mail address if the message is an electronic mail message; and automatically selecting and displaying on the display a reply form for the electronic mail message, including selecting a reply form having predetermined, non-address content based on the sender of the electronic mail message.

\* \* \* \* \*

UNITED STATES PATENT AND TRADEMARK OFFICE
CERTIFICATE OF CORRECTION

| | | |
|---|---|---|
| PATENT NO. | : 6,169,911 B1 | Page 1 of 1 |
| APPLICATION NO. | : 08/938378 | |
| DATED | : January 2, 2001 | |
| INVENTOR(S) | : Wagner et al. | |

It is certified that error appears in the above-identified patent and that said Letters Patent is hereby corrected as shown below:

On The Title Page,

In Item [57], Abstract, line #4, after "Messages" please insert -- (44) --.

In Item [57], Abstract, line #10, after "number" please insert -- (45) --.

In Item [57], Abstract, line #12, after "address" please insert -- (52) --.

In Item [57], Abstract, line #12-14, please delete "Reply forms may be ... provided by the sender".

In Item [57], Abstract, line #15, after "number" please insert -- (45) --.

In Item [57], Abstract, line #16, after "number" please insert -- (45) --.

In Item [57], Abstract, line #17-19, please delete "Alternative or more...suggested to the user".

Signed and Sealed this

Thirty-first Day of July, 2007

JON W. DUDAS
*Director of the United States Patent and Trademark Office*